US008236726B2

(12) United States Patent
Liu et al.

(10) Patent No.: US 8,236,726 B2
(45) Date of Patent: Aug. 7, 2012

(54) NICKEL CATALYST FOR SELECTIVE HYDROGENATION

(75) Inventors: Zhongneng Liu, Shanghai (CN); Zaiku Xie, Shanghai (CN); Xiaoling Wu, Shanghai (CN); Minbo Hou, Shanghai (CN); Xinghua Jiang, Shanghai (CN); Hongyuan Zong, Shanghai (CN)

(73) Assignees: China Petroleum & Chemical Corporation, Beijing (CN); Shanghai Research Institute of Petrochemical Technology Sinopec, Shanghai (CN)

( * ) Notice: Subject to any disclaimer, the term of this patent is extended or adjusted under 35 U.S.C. 154(b) by 438 days.

(21) Appl. No.: 12/442,150

(22) PCT Filed: Sep. 20, 2007

(86) PCT No.: PCT/CN2007/002776
§ 371 (c)(1),
(2), (4) Date: Apr. 15, 2009

(87) PCT Pub. No.: WO2008/040175
PCT Pub. Date: Apr. 10, 2008

(65) Prior Publication Data
US 2009/0318739 A1    Dec. 24, 2009

(30) Foreign Application Priority Data

Sep. 20, 2006  (CN) .......................... 2006 1 0116231
Nov. 2, 2006   (CN) .......................... 2006 1 0117854
Nov. 2, 2006   (CN) .......................... 2006 1 0117856
Nov. 21, 2006  (CN) .......................... 2006 1 0118522

(51) Int. Cl.
| C07C 5/03 | (2006.01) |
| B01J 23/02 | (2006.01) |
| B01J 23/04 | (2006.01) |
| B01J 23/10 | (2006.01) |
| B01J 23/755 | (2006.01) |
| B01J 21/02 | (2006.01) |
| B01J 21/06 | (2006.01) |
| B01J 27/19 | (2006.01) |
| B01J 27/188 | (2006.01) |
| B01J 27/047 | (2006.01) |
| B01J 27/051 | (2006.01) |
| B01J 27/138 | (2006.01) |
| B01J 27/132 | (2006.01) |

(52) U.S. Cl. ........ 502/302; 502/224; 502/226; 502/228; 502/229; 502/231; 502/202; 502/203; 502/204; 502/206; 502/208; 502/210; 502/211; 502/213; 502/222; 502/242; 502/232; 502/243; 502/245; 502/248; 502/250; 502/254; 502/255; 502/257; 502/259; 502/263; 502/303; 502/304; 585/276; 585/277; 208/143

(58) Field of Classification Search .................. 502/224, 502/226, 228, 229, 231, 202, 203, 204, 206, 502/208, 210, 211, 213, 222, 216, 219, 220, 502/221, 227, 242, 232, 243, 245, 248, 250, 502/254, 255, 257, 259, 263, 302, 303, 304; 585/276, 277; 208/143

See application file for complete search history.

(56) References Cited

U.S. PATENT DOCUMENTS

| 3,472,763 | A | * | 10/1969 | Le Page et al. ............... 208/255 |
| 4,220,557 | A | * | 9/1980 | Mickelson ..................... 502/228 |
| 4,417,973 | A | * | 11/1983 | Angevine et al. .............. 208/46 |
| 6,686,308 | B2 | * | 2/2004 | Mao et al. ...................... 502/180 |
| 2003/0225305 | A1 | * | 12/2003 | Kaminsky ...................... 585/260 |
| 2004/0127586 | A1 | * | 7/2004 | Jin et al. ........................ 518/715 |

FOREIGN PATENT DOCUMENTS

| CN | 1042696 A | | 6/1990 |
| CN | 1110248 A | | 10/1995 |
| CN | 1995290 A | * | 7/2007 |
| CN | 101037613 A | * | 9/2007 |
| SU | 427729 A | | 10/1974 |

* cited by examiner

Primary Examiner — Elizabeth Wood
(74) Attorney, Agent, or Firm — Scully, Scott, Murphy & Presser, P.C.

(57) ABSTRACT

The present invention discloses a Ni-based catalyst useful in selective hydrogenation, comprising the following components supported on an alumina support: (a) 5.0 to 40.0 wt. % of metallic nickel or oxide(s) thereof; (b) 0.01 to 20.0 wt. % of at least one of molybdenum and tungsten, or oxide(s) thereof; (c) 0.01 to 10.0 wt. % of at least one rare earth element or oxide(s) thereof; (d) 0.01 to 2.0 wt. % of at least one metal from Group IA or Group IIA of the Periodic Table or oxide(s) thereof; (e) 0 to 15.0 wt. % of at least one selected from the group consisting of silicon, phosphorus, boron and fluorine, or oxide(s) thereof; and (f) 0 to 10.0 wt. % of at least one metal from Group IVB of the Periodic Table or oxide(s) thereof; with the percentages being based on the total weight of the catalyst. The catalyst is useful in the selective hydrogenation of a pyrolysis gasoline.

15 Claims, No Drawings

1

NICKEL CATALYST FOR SELECTIVE HYDROGENATION

CROSS REFERENCE OF RELATED APPLICATIONS

The present application claims the benefit of the Chinese Patent Application Nos. 200610116231.4, filed on Sep. 20, 2006; 200610117854.3, filed on Nov. 2, 2006; 200610117856.2, filed on Nov. 2, 2006; and 200610118522.7, filed on Nov. 21, 2006, which are incorporated herein by reference in their entirety and for all purposes.

FIELD OF THE INVENTION

The present invention relates to a Ni-based catalyst useful in selective hydrogenation and to the preparation thereof, in particular, to a Ni-based catalyst useful in selective hydrogenation of a full boiling range pyrolysis gasoline consisting of $C_5$ hydrocarbons up to hydrocarbons having an end boiling point of 204° C. or a middle distillate of pyrolysis gasoline, such as one consisting essentially of $C_6$ to $C_8$ hydrocarbons, and to the preparation thereof.

BACKGROUND OF THE INVENTION

Pyrolysis gasolines are by-products of ethylene industry. When producing ethylene by steam cracking from a liquid feed such as naphtha, gas oil, or the like, an output of the pyrolysis gasolines may be about 60 wt. % or more of the throughput of ethylene. Pyrolysis gasolines are typically subjected first to a first-stage selective hydrogenation to remove highly unsaturated olefins, such as dienes and styrene, and then to a second-stage hydrogenation to remove monoolefins as well as impurities containing sulfur, nitrogen, oxygen, or the like. The hydrotreated pyrolysis gasolines are then mainly used for producing aromatic hydrocarbons. Catalysts currently used in industry for the selective hydrogenation of pyrolysis gasolines are mainly Pd-based catalysts or Ni-based catalysts. These catalysts can be used in hydrogenation processes of middle distillates of pyrolysis gasoline, such as ones consisting of $C_6$ to $C_8$ hydrocarbons, and full boiling range pyrolysis gasolines consisting of $C_5$ hydrocarbons up to hydrocarbons having an end boiling point of 204° C. The pyrolysis gasoline feeds to be hydrotreated from ethylene plants contain generally impurities and poisons, such as dienes, gums (i.e., polymers resulted from the polymerization of unsaturated components, such as dienes and styrene), As and heavy metals, although their contents may be quite different due to the differences of individual ethylene plants in cracking feedstock and cracking condition. These impurities and poisons will likely cause the deactivation of Pd-based catalysts. Ni-based catalysts have important use in the selective hydrogenation of pyrolysis gasolines, in particular full boiling range pyrolysis gasolines, because of their tolerance to As and stability at lower temperature.

Chinese Patent Application CN1644656A discloses a hydrogenation catalyst as well as relevant process and use. The catalyst contains 10 to 30 wt. % of NiO and 70 to 90 wt. % of $Al_2O_3$. This catalyst is suitable for the hydrogenation of distillate oils containing dienes and styrene as well as derivatives thereof, and the reaction conditions are as follows: temperature=50 to 200° C., pressure=2.0 to 4.0 MPa, liquid weight hourly space velocity=1 to 10 $h^{-1}$, volume ratio of hydrogen to oil=100 to 300. With this catalyst and process, it is possible to produce directly a solvent oil having a high aromatic hydrocarbon content or a gasoline having a high octane value via hydrogenation.

Chinese Patent Application CN1218822A discloses a catalyst for selective hydrogenation. The catalyst consists of 5 to 25 wt. % of NiO, 0.1 to 2.0 wt. % of lithium or an alkaline earth metal (preferably magnesium), and the balance amount of alumina, and is suitable for the selective hydrogenation process of distillate oils containing diolefins, in particular full boiling range pyrolysis gasolines.

Chinese Patent Application CN1415413A discloses a nanonickel-based hydrogenation catalyst and the preparation thereof. This invention coats uniformly 20-50 nm sized powdery nickel on support strips via mechanical vibration, and then immobilizes them by sintering.

U.S. Pat. No. 6,686,308 discloses a supported nano-metal catalyst, comprising catalyst metal nanoparticles having an average particle size of 3 nm or less supported on support particles (for example, carbon). Typical catalyst metals include Ni, Pd, Pt, Ru, etc. A method of making the catalyst comprises the steps of: a) providing a solution of metal chlorides of one or more catalyst metals in solvent system containing at least one polyalcohol; b) forming a colloidal suspension of unprotected catalyst metal nanoparticles by raising the pH of the solution and heating the solution; c) adding support particles to the colloidal suspension; and d) depositing the unprotected catalyst metal nanoparticles on the support particles by lowering the pH of the suspension.

However, there still needs a Ni-based catalyst suitable for the hydrogenation of pyrolysis gasolines, which has better tolerance to water, heavy metals (such as Pb) and As, proper tolerance to gums, higher activity at lower temperature, and good selectivity, to prolong regeneration cycle length and service lifetime of the catalyst.

SUMMARY OF THE INVENTION

The present invention attempts to solve the problems suffered by the prior art, such as low activity at lower temperature and inferior stability of hydrogenation catalysts, by providing a novel Ni-based catalyst for selective hydrogenation. Said catalyst is suitable for the selective hydrogenation of a middle distillate of pyrolysis gasoline, such as one consisting of $C_6$ to $C_8$ hydrocarbons, or a full boiling range pyrolysis gasoline consisting of $C_5$ hydrocarbons up to hydrocarbons having an end boiling point of 204° C., and has good activity at lower temperature, good selectivity and good stability.

An object of the invention is to provide a Ni-based catalyst useful in selective hydrogenation, comprising the following components supported on an alumina support:

(a) 5.0 to 40.0 wt. % of metallic nickel or oxide(s) thereof;
(b) 0.01 to 20.0 wt. % of at least one of molybdenum and tungsten, or oxide(s) thereof;
(c) 0.01 to 10.0 wt. % of at least one rare earth element or oxide(s) thereof;
(d) 0.01 to 2.0 wt. % of at least one metal from Group IA or Group IIA of the Periodic Table or oxide(s) thereof;
(e) 0 to 15.0 wt. % of at least one selected from the group consisting of silicon, phosphorus, boron and fluorine, or oxide(s) thereof; and
(f) 0 to 10.0 wt. % of at least one metal from Group IVB of the Periodic Table or oxide(s) thereof;

with the percentages being based on the total weight of the catalyst.

Another object of the invention is to provide a process for preparing the catalyst according to the invention.

Still another object of the invention is to provide a process for selectively hydrogenating a pyrolysis gasoline, comprising contacting the pyrolysis gasoline with the catalyst according to the invention under hydrogenation conditions.

DETAILED DESCRIPTION OF PREFERRED EMBODIMENTS

In a first aspect, the present invention provides a Ni-based catalyst useful in selective hydrogenation, comprising the following components supported on an alumina support:

(a) 5.0 to 40.0 wt. % of metallic nickel or oxide(s) thereof;

(b) 0.01 to 20.0 wt. % of at least one of molybdenum and tungsten, or oxide(s) thereof;

(c) 0.01 to 10.0 wt. % of at least one rare earth element or oxide(s) thereof;

(d) 0.01 to 2.0 wt. % of at least one metal from Group IA or Group IIA of the Periodic Table or oxide(s) thereof;

(e) 0 to 15.0 wt. % of at least one selected from the group consisting of silicon, phosphorus, boron and fluorine, or oxide(s) thereof; and (f) 0 to 10.0 wt. % of at least one metal from Group IVB of the Periodic Table or oxide(s) thereof;

with the percentages being based on the total weight of the catalyst.

In an embodiment, the catalyst contains nickel grains having an average particle size of from 1.5 to 4.5 nm, preferably from 2 to 4 nm.

Preferably, the catalyst comprises the metallic nickel or oxide(s) thereof in an amount of from 5.0 to 35.0 wt. %, and more preferably from 10.0 to 30.0 wt. %, based on the total weight of the catalyst.

Preferably, the catalyst comprises the at least one of molybdenum and tungsten or oxide(s) thereof in an amount of from 0.1 to 15.0 wt. %, based on the total weight of the catalyst.

Preferably, the catalyst comprises the at least one rare earth element or oxide(s) thereof in an amount of from 0.05 to 7.5 wt. %, and more preferably from 0.1 to 5.0 wt. %, based on the total weight of the catalyst.

Preferably, the catalyst comprises the at least one metal from Group IA or Group IIA of the Periodic Table or oxide(s) thereof in an amount of from 0.1 to 1.2 wt. %, and more preferably from 0.2 to 0.8 wt. %, based on the total weight of the catalyst.

Preferably, the catalyst comprises the at least one selected from the group consisting of silicon, phosphorus, boron and fluorine or oxide(s) thereof in an amount of from 0.2 to 13.0 wt. %, and more preferably from 0.5 to 10.0 wt. %, based on the total weight of the catalyst.

Preferably, the catalyst comprises the at least one metal from Group IVB of the Periodic Table or oxide(s) thereof in an amount of from 0.05 to 7.5 wt. %, and more preferably from 0.1 to 5.0 wt. %, based on the total weight of the catalyst.

The rare earth element is preferably lanthanum and/or cerium The metal from Group IA or IIA is preferably at least one of potassium, calcium, magnesium and barium. The Group IVB metal is preferably titanium and/or zirconium.

The alumina support useful in the present invention has a specific surface area of preferably from 100 to 180 m$^2$/g, and more preferably from 120 to 160 m$^2$/g, and a total pore volume of preferably from 0.5 to 1.3 ml/g, and more preferably from 0.8 to 1.2 ml/g. In the alumina support, a pore volume of pores having a pore diameter of less than 30 nm accounts for preferably 20 to 80%, and more preferably 20 to 60% of the total pore volume; a pore volume of pores having a pore diameter of from 30 to 60 nm accounts for preferably 5 to 65%, and more preferably 20 to 40% of the total pore volume; and a pore volume of pores having a pore diameter of larger than 60 nm accounts for preferably 20 to 50%, and more preferably 25 to 45% of the total pore volume.

The alumina support may be a commercially available product. Alternatively, the alumina support may be prepared by a process known per se in the art. For example, the alumina support may be prepared by a process comprising the steps of: (i) mixing at least one alumina or precursor thereof, water, a sol-forming agent and/or a binder, and optionally a modifier in desired proportions, to provide a mixture; (ii) moulding the mixture from step (i); and (iii) drying the moulded mixture, and then calcining it. The drying of the moulded mixture may be performed at a temperature of from 50 to 120° C. for 1 to 24 hours. The calcining may be carried out at a temperature of from 700 to 1150° C., and preferably from 800 to 1100° C. for 1 to 10 hours, and preferably for 2 to 8 hours.

The alumina or precursor thereof may be selected from the group consisting of pseudoboehmite, aluminas in other phases (including γ-alumina, η-alumina, δ-alumina, θ-alumina, κ-alumina and α-alumina), and mixtures thereof.

The sol-forming agent useful in the preparation of the alumina support according to the invention refers to substance that can reacts with an alumina or an alumina precursor to form a sol, such as monocarboxylic acids, for example, formic acid, acetic acid, propanoic acid, butanoic acid, etc.; dicarboxylic acids or polycarboxylic acids, for example, succinic acid, maleic acid, citric acid, etc.; anhydrides and weak base salts of said carboxylic acids; inorganic monoprotic acids, for example, nitric acid, hydrochloric acid, etc.; and salts of strong acids, for example, aluminum nitrate, nickel nitrate, aluminum trichloride, aluminum sulfate, etc. The binder useful in the preparation of the alumina support according to the invention refers to substance that can bind various alumina powders together at room temperature or lower temperature, such as inorganic sols, for example, alumina sol, silica sol, etc.; and polymers, such as polyvinyl alcohols, polyacrylic acids, polymethacrylic acids, poly(vinyl acetate-co-ethylene), polystyrenes and polybutadienes, having a number average molecular weight of from 500 to 100,000, preferably from 700 to 50,000, and more preferably from 800 to 30,000. Preferably, the sol-forming agent and/or the binder are/is at least one selected from the group consisting of nitric acid, acetic acid, citric acid, alumina sol, silica sol, and polyvinyl alcohols (having a number average molecular weight of from 1,000 to 4,000). The sol-forming agent and/or the binder are/is used in an amount of from 0.2 to 20 wt. %, and preferably from 0.5 to 10 wt. %, based on the solid contents of the mixture obtained in step (i).

In the above process, water may be used in an amount of from 60 to 140% by weight of the solid contents of the mixture obtained in step (i). The water may be added alone or as a solvent or a dispersion medium of another component.

The modifier, which is optionally used in the above process, includes compounds of metals from Groups IA and IIA of the Periodic Table, such as salts and oxides of K, Ca, Mg and Ba; silicon compounds; phosphorus compounds; boron compounds; fluorine compounds; and combinations thereof. In a preferred embodiment, the modifier is a combination of at least one member selected from the group consisting of salts and oxides of K, Ca, Mg and Ba with at least one member selected from the group consisting of silicon compounds, phosphorus compounds, boron compounds, and fluorine compounds. The modifier may be used in an amount in terms of metal(s) from Group IA or IIA, Si, P, B and F of from 0.01 to 20 wt. %, and preferably from 0.2 to 12 wt. %, based on the solid contents of the mixture obtained in step (i). The modifier contained in the alumina support constitutes part or all of the component (d) and/or the component (e) of the catalyst according to the invention.

The moulding in step (ii) of the above process may be carried out by a conventional process, for example, by compressing into tablets, rolling into pellets, extruding into strips, and the like. In a preferred embodiment, the moulding is accomplished by an extrusion process.

In a preferred embodiment, the catalyst further comprises sulfur or compound(s) thereof in an amount of from 0.01 to 10.0 wt. %, and preferably from 0.1 to 8.0 wt. %, based on the total weight of the catalyst.

In a second aspect, the present invention provides a process for preparing the catalyst according to the invention, comprising the steps of
  i) providing an alumina support, which comprises optionally part or all of the catalyst component (d), and optionally part or all of the catalyst component (e) if desired,
  ii) dissolving materials providing the other catalyst components in desired amounts in water to form an impregnation solution;
  iii) impregnating the alumina support with the impregnation solution to provide an impregnated support;
  iv) drying the impregnated support;
  v) optionally, repeating steps iii) and iv) for one or more times; and
  vi) calcining the dried support from step iv) or v) in air, to give an oxidized catalyst.

Nickel compounds useful in the process according to the invention to provide the Ni component are water-soluble Ni compounds or water-soluble complexes of water-insoluble Ni compounds, which can be decomposed at an elevated temperature into nickel oxides. Examples of water-soluble Ni compounds include, but are not limited to, nickel formate, nickel acetate and nickel nitrate. Examples of water-soluble complexes of water-insoluble Ni compounds include, but are not limited to, complexes of nickel carbonate, basic nickel carbonate, nickel hydroxide or nickel oxalate, wherein examples of complexing agent used therein include, but are not limited to, organic amines, such as ethylene diamine; ammonium carbamate; ammonium aminoacetate; ammonium carbonate; and ammonium bicarbonate.

There are not specific limitations to the materials providing the other catalyst components so long as they are water-soluble. For example, the materials providing the catalyst components may be water-soluble inorganic acids, oxides or salts. It is within the knowledge of those skilled in the art to select suitable catalyst component-providing materials so as to ensure that the formed impregnation liquid is a solution.

The drying can be conducted at a temperature of from 40 to 200° C., preferably from 50 to 150° C., and more preferably from 60 to 100° C. The drying can be conducted for a period of time of from 0.5 to 24 hours, and preferably from 1 to 12 hours.

The calcining can be conducted at a temperature of from 250 to 900° C., preferably from 300 to 700° C., and more preferably from 350 to 500° C. The calcining can be conducted for a period of time of from 1 to 24 hours, and preferably from 2 to 12 hours.

The oxidized catalyst should be reduced with a reducing agent, preferably hydrogen gas, prior to use. The method and conditions for reducing the oxidized catalyst are well known by those skilled in the art. For example, the oxidized catalyst may be reduced in a reactor at a temperature of from 200 to 700° C., preferably from 300 to 600° C. under a hydrogen gas pressure of from 0.05 to 5.0 MPaa, preferably from 0.1 to 3.0 MPaa for 1 to 24 hours, preferably 2 to 12 hours.

In a preferred embodiment, the catalyst is subjected to a pre-sulfurizing treatment prior to use. The pre-sulfurizing treatment of the catalyst can be carried out by an in situ pre-sulfurizing process or by an out-reactor pre-sulfurizing process. The in situ pre-sulfurizing process refers to one in which a feed oil containing a sulfurizing agent is directly introduced into the reactor after the catalyst has been reduced. The out-reactor pre-sulfurizing process refers to one in which a catalyst having been reduced/passivated (in a passivating process, a catalyst having been reduced is cooled to a temperature of 80° C. or lower, and then a mixed gas of air and nitrogen is introduced with the level of air in the mixed gas being increased gradually so that the surface of Ni grains is coated gradually by a nickel oxide film which protects the catalyst. The passivated catalyst may contact directly with air) is contacted with a sulfurizing agent and then charged into a reactor. Examples of suitable sulfurizing agents include, but are not limited to, organic sulfur compounds, such as n-butyl mercaptan (NBM), dimethyl disulfide (DMDS), dimethyl sulfide (DMS), di-tert-nonyl polysulfide (TNPS), and ethyl mercaptan (EM).

The catalyst of the invention is suitable for the selective hydrogenation of alkynes, conjugated dienes, and the like in petrolic hydrocarbons, including the hydrogenation of a full boiling range pyrolysis gasoline (consisting of $C_5$ hydrocarbons up to hydrocarbons having an end boiling point of 204° C.) or a middle distillate of pyrolysis gasoline, such as one consisting of $C_6$ to $C_8$ hydrocarbons.

Thus, in a third aspect, the present invention provides a process for selectively hydrogenating a pyrolysis gasoline, comprising contacting the pyrolysis gasoline with the selective hydrogenation catalyst according to the invention under hydrogenation conditions.

The process for selectively hydrogenating a pyrolysis gasoline may be carried out in a manner well known by those skilled in the art.

When used in the selective hydrogenation of a full boiling range pyrolysis gasoline (consisting of $C_5$ hydrocarbons up to hydrocarbons having an end boiling point of 204° C.) or a middle distillate of pyrolysis gasoline, such as one consisting of $C_6$ to $C_8$ hydrocarbons, the catalyst according to the invention exhibits good activity at lower temperature, selectivity and stability. Under the following conditions: inlet temperature=50° C., hydrogen pressure=0.27 MPa, volume ratio of hydrogen to oil=100:1, volume space velocity of fresh oil=3.8 $h^{-1}$, and volume space velocity of total oil=7.6 $h^{-1}$ (i.e., recycle ratio=1), a selective hydrogenation of a full boiling range pyrolysis gasoline (consisting of $C_5$ hydrocarbons up to hydrocarbons having an end boiling point of 204° C.) may give an average diene value at outlet as low as 0.0 g iodine/100 g oil, that is, a conversion of diene as high as 100%.

EXAMPLES

The following examples are given for further illustrating the invention, but do not make limitation to the invention in any way.

Example 1

450 g of pseudoboehmite and 13.5 g of Sesbania cannabina powder were mixed together, and then to the mixture was added 480 ml aqueous solution containing 25 g of 5 wt. % aqueous solution of polyvinyl alcohol (number average molecular weight=1750), 6.5 g of nitric acid, 8.4 g of 85% phosphoric acid, 3.5 g of potassium nitrate, and 13.9 g of magnesium nitrate. The resultant mixture was mixed homogeneously, and then extruded into φ2.5 mm trilobal extrudes. The wet extrudes were dried at 120° C. for 4 hours, and then calcined at 1150° C. for 2 hours, to give a support, Z1. The specific surface area, pore volume, probable pore diameter, and pore distribution of the support Z1 were measured by mercury intrusion method. The results are shown in the Table 1 below.

Example 2

350 g of pseudoboehmite and 10.5 g of Sesbania cannabina powder were mixed together, and then to the mixture was added 320 ml aqueous solution containing 20 g of 5 wt. % aqueous solution of polyvinyl alcohol (number average molecular weight=1750), 2.6 g of emulsion of poly(vinyl acetate-co-ethylene) (VAE707, having a solid content of 54.5 wt %, available from the Sichuan Vinylon Factory, China Petroleum and Chemical Corporation), 4.6 g of potassium nitrate, and 0.7 g of barium nitrate. The resultant mixture was mixed homogeneously, and then extruded into φ2.5 mm trilobal extrudes. The wet extrudes were dried at 120° C. for 4 hours, and then calcined at 850° C. for 4 hours, to give a support, Z2. The specific surface area, pore volume, probable pore diameter, and pore distribution of the support Z2 were measured by mercury intrusion method. The results are shown in the Table 1 below.

Example 3

300 g of pseudoboehmite, 35 g of diatomite and 9 g of Sesbania cannabina powder were mixed together, and then to the mixture was added 280 ml aqueous solution containing 18 g of 5 wt. % aqueous solution of polyvinyl alcohol (number average molecular weight=1750), 3.5 g of acetic acid and 2.8 g of calcium nitrate. The resultant mixture was mixed homogeneously, and then extruded into φ2.5 mm trilobal extrudes. The wet extrudes were dried at 50° C. for 24 hours, and then calcined at 750° C. for 4 hours, to give a support, Z3. The specific surface area, pore volume, probable pore diameter, and pore distribution of the support Z3 were measured by mercury intrusion method. The results are shown in the Table 1 below.

Example 4

345 g of pseudoboehmite and 10 g of Sesbania cannabina powder were mixed together, and then to the mixture was added 340 ml aqueous solution containing 19 g of 5 wt. % aqueous solution of polyvinyl alcohol (number average molecular weight=1750), 3.0 g of nitric acid, 34.5 g of alumina sol (alumina content=10 wt. %) and 2.9 g of calcium nitrate. The resultant mixture was mixed homogeneously, and then extruded into φ2.5 mm trilobal extrudes. The wet extrudes were dried at 50° C. for 24 hours, and then calcined at 950° C. for 4 hours, to give a support, Z4. The specific surface area, pore volume, probable pore diameter, and pore distribution of the support Z4 were measured by mercury intrusion method. The results are shown in the Table 1 below.

Example 5

300 g of pseudoboehmite, 35 g of diatomite and 9 g of Sesbania cannabina powder were mixed together, and then to the mixture was added 360 ml aqueous solution containing 18 g of 5 wt. % aqueous solution of polyvinyl alcohol (number average molecular weight=1750), 3.6 g of acetic acid, 3.6 g of citric acid, and 2.8 g of calcium nitrate. The resultant mixture was mixed homogeneously, and then extruded into φ2.5 mm trilobal extrudes. The wet extrudes were dried at 50° C. for 24 hours, and then calcined at 750° C. for 4 hours, to give a support, Z5. The specific surface area, pore volume, probable pore diameter, and pore distribution of the support Z5 were measured by mercury intrusion method. The results are shown in the Table 1 below.

Comparative Example 1

300 g of pseudoboehmite, 9 g of Sesbania cannabina powder and 45 g of graphite were mixed homogeneously, and then to the mixture was added 340 ml aqueous solution containing 19 g of 5 wt. % aqueous solution of polyvinyl alcohol (number average molecular weight=1750) and 7.0 g of nitric acid. The resultant mixture was mixed homogeneously, and then extruded into φ2.5 mm trilobal extrudes. The wet extrudes were dried at 120° C. for 4 hours, and then calcined at 1050° C. for 4 hours, to give a support, D1. The specific surface area, pore volume, probable pore diameter, and pore distribution of the support D1 were measured by mercury intrusion method. The results are shown in the Table 1 below.

TABLE 1

|  | Ex. 1 | Ex. 2 | Ex. 3 | Ex. 4 | Ex. 5 | Comp. Ex. 1 |
| --- | --- | --- | --- | --- | --- | --- |
| Support | Z1 | Z2 | Z3 | Z4 | Z5 | D1 |
| Specific surface area, m²/g | 122.4 | 138.7 | 157.2 | 129.3 | 148.6 | 102.3 |
| Pore volume, cc/g | 1.15 | 0.95 | 0.84 | 1.02 | 0.88 | 0.56 |
| Probable pore diameter, nm | 24 | 22 | 21 | 23 | 22 | 22 |
| Pore distribution % |  |  |  |  |  |  |
| <30 nm | 48 | 52 | 55 | 42 | 40 | 92.6 |
| 30 to 60 nm | 7 | 21 | 13 | 18 | 27 | 3.8 |
| >60 nm | 45 | 27 | 32 | 40 | 33 | 3.6 |

Example 6

Water was added to 0.19 g of ammonium molybdate, 0.27 g of lanthanum nitrate and 9.0 g of zirconium nitrate until the total weight was 40 g, and then the resultant solution was combined with 71.4 g of an aqueous solution of the complex of basic nickel carbonate with ammonium carbamate having a concentration in terms of nickel of 14 wt. %, to form an impregnation liquid. 100 g of the support Z1 was impregnated with the impregnation liquid. After the liquid was removed, the solids were dried at 60° C. for 8 hours, and then calcined at 450° C. for 4 hours, to give a Ni-based catalyst, C1. The composition of the catalyst is shown in the Table 2 below, with the contents of the individual components being based on the weight of the alumina support.

Example 7

Water was added to 9.3 g of ammonium molybdate, 7.4 g of ammonium tungstate, 6.7 g of lanthanum nitrate, 7.8 g of cerium nitrate, 12.9 g of titanium tetrachloride, 28.7 g of boric acid and 5.3 g of hydrofluoric acid until the total weight was 125 g, and then the resultant solution was combined with 75 g of an aqueous solution of nickel nitrate having a concentration in terms of nickel of 40 wt. %, to form an impregnation liquid. 100 g of the support Z2 was impregnated with 100 g of the impregnation liquid. Upon the completion of the impregnation, the liquid was removed, and then the solids were dried at 60° C. for 8 hours and then calcined at 450° C. for 4 hours. The above impregnating, drying and calcining were repeated for one times, to give a Ni-based catalyst, C2. The composition of the catalyst is shown in the Table 2 below, with the contents of the individual components being based on the weight of the alumina support.

Example 8

27.9 g of ammonium molybdate, 7.8 g of cerium nitrate and 0.36 g of zirconium nitrate were weighed, and water was added thereto until the total weight was 70 g. Then the resultant solution was combined with 100 g of an aqueous solution of nickel acetate having a concentration in terms of nickel of 20 wt. %, to form an impregnation liquid. 100 g of the support Z3 was impregnated with 85 g of the impregnation liquid. Upon the completion of the impregnation, the liquid was removed, and then the solids were dried at 60° C. for 8 hours and then calcined at 450° C. for 4 hours. The above impregnating, drying and calcining were repeated for one times, to give a Ni-based catalyst, C3. The composition of the catalyst is shown in the Table 2 below, with the contents of the individual components being based on the weight of the alumina support.

weight was 76 g. Then the resultant solution was combined with 100 g of an aqueous solution of nickel formate having a concentration in terms of nickel of 20 wt. %, to form an impregnation liquid. 100 g of the support Z5 was impregnated with 88 g of the impregnation liquid. Upon the completion of the impregnation, the liquid was removed, and then the solids were dried at 60° C. for 8 hours and then calcined at 450° C. for 4 hours. The above impregnating, drying and calcining were repeated for one times, to give a Ni-based catalyst, C5. The composition of the catalyst is shown in the Table 2 below, with the contents of the individual components being based on the weight of the alumina support.

Comparative Example 2

100 g of the support D1 was impregnated with 58 g of an aqueous solution of nickel nitrate having a concentration in terms of nickel of 34.5 wt. %. Upon the completion of the impregnation, the liquid was removed, and then the solids were dried at 60° C. for 8 hours and then calcined at 450° C. for 4 hours, to give a Ni-based catalyst, CD1. The composition of the catalyst is shown in the Table 2 below, with the contents of the individual components being based on the weight of the alumina support.

TABLE 2

|  | Example | | | | | |
| --- | --- | --- | --- | --- | --- | --- |
|  | 6 | 7 | 8 | 9 | 10 | Comp. Ex. 2 |
| Catalyst | C1 | C2 | C3 | C4 | C5 | CD1 |
| Support | Z1 | Z2 | Z3 | Z4 | Z5 | D1 |
| Ni content, wt. % | 10 | 30 | 20 | 20 | 20 | 20 |
| Mo/W content, wt. % | Mo-0.1 | Mo-5.0 W-5.0 | Mo-15.0 | W-10.0 | Mo-10.0 | 0 |
| Rare earth element content, wt. % | La-0.1 | La-2.5 Ce-2.5 | Ce-2.5 | La-2.5 | Ce-2.5 | 0 |
| Group IA metal content, wt. % | K-0.3 | K-0.5 | 0 | 0 | 0 | 0 |
| Group IIA metal content, wt. % | Mg-0.5 | Ba-0.1 | Ca-0.2 | Ca-0.2 | Ca-0.2 | 0 |
| Si, P, B or F content, wt. % | P-0.5 | B-5.0 F-5.0 | Si-10.0 | 0 | Si-10.0 | 0 |
| Group IVB metal content, wt. % | Zr-2.5 | Ti-5.0 | Zr-0.1 | Zr-0.1 | 0 | 0 |
| Average Particle diameter of Ni grains, nm | 2.2 | 3.8 | 3.1 | 3.5 | 3.3 | 4.9 |

Example 9

14.8 g of ammonium tungstate, 6.7 g of lanthanum nitrate and 0.36 g of zirconium nitrate were weighed, and water was added thereto until the total weight was 67 g. Then the resultant solution was combined with 133 g of an aqueous solution of the complex of nickel hydroxide with ammonium carbamate having a concentration in terms of nickel of 15 wt. %, to form an impregnation liquid. 100 g of the support Z4 was impregnated with 100 g of the impregnation liquid. Upon the completion of the impregnation, the liquid was removed, and then the solids were dried at 60° C. for 8 hours and then calcined at 450° C. for 4 hours. The above impregnating, drying and calcining were repeated for one times, to give a Ni-based catalyst, C4. The composition of the catalyst is shown in the Table 2 below, with the contents of the individual components being based on the weight of the alumina support.

Example 10

18.6 g of ammonium molybdate and 7.8 g of cerium nitrate were weighed, and water was added thereto until the total Example 11

This example demonstrated the use of the catalysts prepared in Examples 6 to 10 in the selective hydrogenation of a full boiling range pyrolysis gasoline consisting of $C_5$ hydrocarbons up to hydrocarbons having an end boiling point of 204° C.

80 ml of each of the catalysts prepared in Examples 6 to 10 was taken and evaluated in a 100 ml fixed bed mini-reactor. Each catalyst was reduced under the following conditions for 12 hours: hydrogen pressure=0.27 MPa, temperature=450° C., and hydrogen flow rate=1500 ml/min. Then a full boiling range pyrolysis gasoline feed containing 15.5 wt. % of $C_5$ hydrocarbons, 21.8 wt. % of $C_6$ hydrocarbons, 23.3 wt. % of $C_7$ hydrocarbons, 21.3 wt. % of $C_8$ hydrocarbons and 18.1 wt. % of $C_9^+$ hydrocarbons (i.e., hydrocarbons having 9 or more carbon atoms) and having a diene value of 27.12 g iodine/100 g oil was reduced under the following reaction conditions: hydrogen pressure=0.27 MPa, temperature=50° C., volume space velocity of fresh oil=3.8 $h^{-1}$, volume space velocity of total oil=7.6 h$^{-1}$ (i.e., recycle ratio=1), and volume ratio of hydrogen to oil=100:1. The hydrogenation results are shown in the Table 3 below.

Comparative Example 3

80 ml of the catalyst CD1 prepared in Comparative Example 2 was taken and reduced under the same conditions as used in Example 11. Then a hydrogenation experiment was carried out using the same feed and reaction conditions as used in Example 11. The hydrogenation results are shown in the Table 3 below.

TABLE 3

| | Catalyst | Reaction time (h) | Average diene value of product (g iodine/100 g oil) | Average conversion of diene % |
|---|---|---|---|---|
| Ex. 11 | C1 | 250 | 0.45 | 98.34 |
| | C2 | 250 | 0.00 | 100.00 |
| | C3 | 250 | 0.05 | 99.82 |
| | C4 | 250 | 0.21 | 99.23 |
| | C5 | 250 | 0.13 | 99.52 |
| Comp. Ex. 3 | CD1 | 250 | 3.1 | 88.57 |

Example 12

This example showed the results of 1000-hour selective hydrogenation experiment of a full boiling range pyrolysis gasoline consisting of C$_5$ hydrocarbons up to hydrocarbons having an end boiling point of 204° C. carried out by using the catalyst C2 prepared in Example 7.

80 ml of the catalyst C2 was taken and reduced as described in Example 11. Then a full boiling range pyrolysis gasoline feed containing 15.5 wt. % of C$_5$ hydrocarbons, 21.8 wt. % of C$_6$ hydrocarbons, 23.3 wt. % of C$_7$ hydrocarbons, 21.3 wt. % of C$_8$ hydrocarbons and 18.1 wt. % of C$_9^+$ g hydrocarbons and having a diene value of 27.12 g iodine/100 g oil was reduced under the following reaction conditions: temperature=50° C., hydrogen pressure=0.265 MPa, volume space velocity of fresh oil=3.8 h$^{-1}$, volume space velocity of total oil=7.6 h$^{-1}$, and volume ratio of hydrogen to oil=100:1, and the experiment was continued for 1000 hours. The hydrogenation results are shown in the Table 4 below.

Comparative Example 4

80 ml of the catalyst CD1 prepared in Comparative Example 2 was taken and reduced under the same conditions as used in Example 11. Then a hydrogenation experiment was carried out by using the same feed and reaction conditions as used in Example 12, and the experiment was continued for 200 hours. The hydrogenation results are shown in the Table 4 below.

TABLE 4

| | Catalyst | Reaction time (h) | Diene value of product (g iodine/100 g oil) | Conversion of diene (%) |
|---|---|---|---|---|
| Example 12 | C2 | 100 | 0.00 | 100.00 |
| | | 200 | 0.00 | 100.00 |
| | | 300 | 0.10 | 99.63 |
| | | 400 | 0.07 | 99.74 |
| | | 500 | 0.13 | 99.52 |
| | | 600 | 0.33 | 98.78 |
| | | 700 | 0.00 | 100.00 |
| | | 800 | 0.00 | 100.00 |

TABLE 4-continued

| | Catalyst | Reaction time (h) | Diene value of product (g iodine/100 g oil) | Conversion of diene (%) |
|---|---|---|---|---|
| | | 900 | 0.20 | 99.26 |
| | | 1000 | 0.13 | 99.52 |
| Comparative Example 4 | CD1 | 50 | 2.96 | 89.09 |
| | | 100 | 4.66 | 82.82 |
| | | 150 | 7.39 | 72.75 |
| | | 200 | 8.06 | 70.28 |

Example 13

This example showed the results of 500-hour selective hydrogenation experiment of a pyrolysis gasoline middle distillate consisting of C$_6$ to C$_8$ hydrocarbons carried out by using the catalyst C2 prepared in Example 7.

80 ml of the catalyst C2 was taken and reduced as described in Example 11. Then a pyrolysis gasoline middle distillate containing 32.8 wt. % of C$_6$ hydrocarbons, 35.1 wt. % of C$_7$ hydrocarbons and 32.1 wt. % of C$_8$ hydrocarbons and having a diene value of 23.99 g iodine/100 g oil was reduced under the following reaction conditions: temperature=50° C., hydrogen pressure=0.265 MPa, volume space velocity of fresh oil=3.0 h$^{-1}$, volume space velocity of total oil=7.5 h$^{-1}$, and volume ratio of hydrogen to oil=110:1, and the experiment was continued for 500 hours. The hydrogenation results are shown in the Table 5 below.

TABLE 5

| Reaction time (h) | Diene value of product (g iodine/100 g oil) | Conversion of diene (%) |
|---|---|---|
| 50 | 0.00 | 100.00 |
| 100 | 0.03 | 99.87 |
| 150 | 0.05 | 99.79 |
| 200 | 0.10 | 99.58 |
| 250 | 0.07 | 99.71 |
| 300 | 0.06 | 99.75 |
| 350 | 0.05 | 99.79 |
| 400 | 0.04 | 99.83 |
| 450 | 0.02 | 99.92 |
| 500 | 0.05 | 99.79 |

Example 14

80 ml of each of the catalysts prepared in Examples 6 to 10 was taken and evaluated in a 100 ml fixed bed mini-reactor. Each catalyst was reduced under the following conditions for 24 hours: hydrogen pressure=0.10 MPa, temperature=450° C., and hydrogen flow rate=1500 ml/min. Then a full boiling range pyrolysis gasoline feed containing 15.5 wt. % of C$_5$ hydrocarbons, 21.8 wt. % of C$_6$ hydrocarbons, 23.3 wt. % of C$_7$ hydrocarbons, 21.3 wt. % of C$_8$ hydrocarbons and 18.1 wt. % of C$_9^+$ hydrocarbons (i.e., hydrocarbons having 9 or more carbon atoms) and having a diene value of 27.12 g iodine/100 g oil was reduced under the following reaction conditions: hydrogen pressure=0.27 MPa, temperature=50° C., volume space velocity of fresh oil=3.8 h$^{-1}$, volume space velocity of total oil=7.6 h$^{-1}$ (i.e., recycle ratio=1), and volume ratio of hydrogen to oil=100:1. The hydrogenation results are shown in the Table 6 below.

Comparative Example 5

80 ml of the catalyst CD1 prepared in Comparative Example 2 was taken and reduced under the same conditions as used in Example 14. Then a hydrogenation experiment was carried out using the same feed and reaction conditions as used in Example 14. The hydrogenation results are shown in the Table 6 below.

TABLE 6

|  | Catalyst | Reaction time (h) | Average diene value of product (g iodine/100 g oil) | Average conversion of diene % |
|---|---|---|---|---|
| Ex. 14 | C1 | 350 | 0.55 | 97.97 |
|  | C2 | 350 | 0.20 | 99.26 |
|  | C3 | 350 | 0.35 | 98.71 |
|  | C4 | 350 | 0.47 | 98.27 |
|  | C5 | 350 | 0.40 | 98.53 |
| Comp. Ex. 5 | CD1 | 350 | 3.20 | 88.20 |

Example 15

The catalyst C1 as prepared in Example 6 was reduced and passivated in a fixed bed reactor as follows. The catalyst was reduced under the following conditions for 24 hours: hydrogen pressure=0.10 MPa, temperature=450° C., and hydrogen flow rate=1500 ml/min. Upon the completion of the reduction, the hydrogen flow was stopped, and temperature was lowered by passing a nitrogen flow through the catalyst. After the temperature was lowered to 80° C., the nitrogen flow was switched to a mixed gas of air and nitrogen, and the level of air in the mixed gas was increased gradually until the level of air reached 100%. Upon the completion of the passivation, the reduced and passivated catalyst was removed from the reactor bed.

100 g of the reduced and passivated catalyst was impregnated with 97 g of a solution of dimethyl disulfide in cyclohexane having a concentration in terms of sulfur of 0.2 wt %. After removing the liquid, the solids were dried in a nitrogen flow at 80° C. for 8 hours to remove the cyclohexane, thereby giving a catalyst C6. The composition of the catalyst is shown in the Table 7 below, with the contents of the individual components being based on the weight of the alumina support except that the sulfur content is based on the weight of the catalyst.

Example 16

The catalyst C2 as prepared in Example 7 was reduced and passivated as described in Example 15. 100 g of the reduced and passivated catalyst was impregnated with 80 g of a solution of dimethyl disulfide in cyclohexane having a concentration in terms of sulfur of 10 wt %. After removing the liquid, the solids were dried in a nitrogen flow at 80° C. for 8 hours to remove the cyclohexane, thereby giving a catalyst C7. The composition of the catalyst is shown in the Table 7 below, with the contents of the individual components being based on the weight of the alumina support except that the sulfur content is based on the weight of the catalyst.

Example 17

The catalyst C3 as prepared in Example 8 was reduced and passivated as described in Example 15. 100 g of the reduced and passivated catalyst was impregnated with 70 g of a solution of dimethyl disulfide in cyclohexane having a concentration in terms of sulfur of 6.1 wt %. After removing the liquid, the solids were dried in a nitrogen flow at 80° C. for 8 hours to remove the cyclohexane, thereby giving a catalyst C8. The composition of the catalyst is shown in the Table 7 below, with the contents of the individual components being based on the weight of the alumina support except that the sulfur content is based on the weight of the catalyst.

Example 18

The catalyst C4 as prepared in Example 9 was reduced and passivated as described in Example 15. 100 g of the reduced and passivated catalyst was impregnated with 87 g of a solution of dimethyl disulfide in cyclohexane having a concentration in terms of sulfur of 2.4 wt %. After removing the liquid, the solids were dried in a nitrogen flow at 80° C. for 8 hours to remove the cyclohexane, thereby giving a catalyst C9. The composition of the catalyst is shown in the Table 7 below, with the contents of the individual components being based on the weight of the alumina support except that the sulfur content is based on the weight of the catalyst.

Example 19

The catalyst C5 as prepared in Example 10 was reduced and passivated as described in Example 15. 100 g of the reduced and passivated catalyst was impregnated with 48 g of a solution of dimethyl disulfide in cyclohexane having a concentration in terms of sulfur of 12.1 wt %. After removing the liquid, the solids were dried in a nitrogen flow at 80° C. for 8 hours to remove the cyclohexane, thereby giving a catalyst C10. The composition of the catalyst is shown in the Table 7 below, with the contents of the individual components being based on the weight of the alumina support except that the sulfur content is based on the weight of the catalyst.

TABLE 7

|  | Example | | | | | |
|---|---|---|---|---|---|---|
|  | 15 | 16 | 17 | 18 | 19 | Comp. Ex. 6 |
| Catalyst | C6 | C7 | C8 | C9 | C10 | CD1 |
| Support | Z1 | Z2 | Z3 | Z4 | Z5 | D1 |
| Ni content, wt. % | 10 | 30 | 20 | 20 | 20 | 20 |
| Mo/W content, wt. % | Mo-0.1 | Mo-5.0 W-5.0 | Mo-15.0 | W-10.0 | Mo-10.0 | 0 |
| Rare earth element content, wt. % | La-0.1 | La-2.5 Ce-2.5 | Ce-2.5 | La-2.5 | Ce-2.5 | 0 |
| Group IA metal content, wt. % | K-0.3 | K-0.5 | 0 | 0 | 0 | 0 |
| Group IIA metal content, wt. % | Mg-0.5 | Ba-0.1 | Ca-0.2 | Ca-0.2 | Ca-0.2 | 0 |
| Si, P, B or F content, wt. % | P-0.5 | B-5.0 F-5.0 | Si-10.0 | 0 | Si-10.0 | 0 |

TABLE 7-continued

| | Example | | | | | |
|---|---|---|---|---|---|---|
| | 15 | 16 | 17 | 18 | 19 | Comp. Ex. 6 |
| Group IVB metal content, wt. % | Zr-2.5 | Ti-5.0 | Zr-0.1 | Zr-0.1 | 0 | 0 |
| Sulfur content, wt. % | 0.2 | 8.0 | 4.3 | 2.1 | 5.8 | 0 |

Example 20

This example demonstrated the use of the catalysts prepared in Examples 15 to 19 in the selective hydrogenation of a full boiling range pyrolysis gasoline consisting of $C_5$ hydrocarbons up to hydrocarbons having an end boiling point of 204° C.

80 ml of each of the catalysts prepared in Examples 15 to 19 was taken and evaluated in a 100 ml fixed bed mini-reactor. Each catalyst was reduced under the following conditions for 6 hours: hydrogen pressure=0.27 MPa, temperature=180° C., and hydrogen flow rate=1500 ml/min. Then a full boiling range pyrolysis gasoline feed containing 15.5 wt. % of $C_5$ hydrocarbons, 21.8 wt. % of $C_6$ hydrocarbons, 23.3 wt. % of $C_7$ hydrocarbons, 21.3 wt. % of $C_8$ hydrocarbons and 18.1 wt. % of $C_9^+$ hydrocarbons (i.e., hydrocarbons having 9 or more carbon atoms) and having a diene value of 27.12 g iodine/100 g oil was reduced under the following reaction conditions: hydrogen pressure=0.27 MPa, temperature=50° C., volume space velocity of fresh oil=3.8 $h^{-1}$, volume space velocity of total oil=7.6 $h^{-1}$ (i.e., recycle ratio=1), and volume ratio of hydrogen to oil=100:1. The hydrogenation results are shown in the Table 8 below.

Comparative Example 6

80 ml of the catalyst CD1 prepared in Comparative Example 2 was charged into a 100 ml fixed bed mini-reactor and reduced under the same conditions as used in Example 15. Then a hydrogenation experiment was carried out by using the same feed and reaction conditions as used in Example 20. The hydrogenation results are shown in the Table 8 below.

TABLE 8

| | Catalyst | Reaction time (h) | Average diene value of product (g iodine/100 g oil) | Average conversion of diene % |
|---|---|---|---|---|
| Ex. 20 | C6 | 250 | 0.66 | 97.57 |
| | C7 | 250 | 0.37 | 98.64 |
| | C8 | 250 | 0.51 | 98.12 |
| | C9 | 250 | 0.72 | 97.35 |
| | C10 | 250 | 0.65 | 97.60 |
| Comp. Ex. 6 | CD1 | 250 | 3.20 | 88.20 |

Example 21

This example showed the results of 1000-hour selective hydrogenation experiment of a full boiling range pyrolysis gasoline consisting of $C_5$ hydrocarbons up to hydrocarbons having an end boiling point of 204° C. carried out by using the catalyst C7 prepared in Example 16.

80 ml of the catalyst C7 was taken and reduced as described in Example 20. Then a full boiling range pyrolysis gasoline feed containing 15.5 wt. % of $C_5$ hydrocarbons, 21.8 wt. % of $C_6$ hydrocarbons, 23.3 wt. % of $C_7$ hydrocarbons, 21.3 wt. % of $C_8$ hydrocarbons and 18.1 wt. % of $C_9^+$ hydrocarbons and having a diene value of 27.12 g iodine/100 g oil was reduced under the following reaction conditions: temperature=50° C., hydrogen pressure=0.265 MPa, volume space velocity of fresh oil=3.8 $h^{-1}$, volume space velocity of total oil=7.6 $h^{-1}$, and volume ratio of hydrogen to oil=100:1, and the experiment was continued for 1000 hours. The hydrogenation results are shown in the Table 9 below.

TABLE 9

| | Catalyst | Reaction time (h) | Diene value of product (g iodine/100 g oil) | Conversion of diene (%) |
|---|---|---|---|---|
| Example 21 | C7 | 100 | 0.54 | 98.01 |
| | | 200 | 0.47 | 98.27 |
| | | 300 | 0.56 | 97.94 |
| | | 400 | 0.33 | 98.78 |
| | | 500 | 0.45 | 98.34 |
| | | 600 | 0.62 | 97.71 |
| | | 700 | 0.41 | 98.49 |
| | | 800 | 0.68 | 97.49 |
| | | 900 | 0.53 | 98.05 |
| | | 1000 | 0.39 | 98.56 |

Example 22

This example showed the results of 500-hour selective hydrogenation experiment of a pyrolysis gasoline middle distillate consisting of $C_6$ to $C_8$ hydrocarbons carried out by using the catalyst C7 prepared in Example 16.

80 ml of the catalyst C7 was taken and reduced as described in Example 20. Then a pyrolysis gasoline middle distillate consisting of $C_6$ to $C_8$ hydrocarbons, which contained 32.8 wt. % of $C_6$ hydrocarbons, 35.1 wt. % of $C_7$ hydrocarbons and 32.1 wt. % of $C_8$ hydrocarbons and had a diene value of 23.99 g iodine/100 g oil, was reduced under the following reaction conditions: temperature=50° C., hydrogen pressure=0.265 MPa, volume space velocity of fresh oil=3.0 $h^{-1}$, volume space velocity of total oil=7.5 $h^{-1}$, and volume ratio of hydrogen to oil=110:1, and the experiment was continued for 500 hours. The hydrogenation results are shown in the Table 10 below.

TABLE 10

| Reaction time (h) | Diene value of product (g iodine/100 g oil) | Conversion of diene (%) |
|---|---|---|
| 50 | 0.63 | 97.37 |
| 100 | 0.45 | 98.12 |
| 150 | 0.77 | 96.79 |
| 200 | 0.51 | 97.87 |
| 250 | 0.66 | 97.25 |
| 300 | 0.48 | 98.00 |
| 350 | 0.69 | 97.12 |
| 400 | 0.54 | 97.75 |
| 450 | 0.62 | 97.42 |
| 500 | 0.46 | 98.08 |

The patents, patent applications, non-patent literatures and testing methods cited in the specification are incorporated herein by reference.

While the invention has been described with reference to exemplary embodiments, it is understood by those skilled in the art that various changes and modifications may be made without departing from the spirit and scope of the invention. Therefore, the invention is not limited to the particular embodiments disclosed as the best mode contemplated for carrying out this invention, but the invention will include all embodiments falling within the scope of the appended claims.

What is claimed is:

1. A Ni-based catalyst useful in selective hydrogenation, comprising the following components supported on an alumina support:
    (a) 5.0 to 40.0 wt. % of metallic nickel or oxide(s) thereof;
    (b) 0.01 to 20.0 wt. % of at least one of molybdenum and tungsten, or oxide(s) thereof;
    (c) 0.01 to 10.0 wt. % of at least one rare earth element or oxide(s) thereof;
    (d) 0.01 to 2.0 wt. % of at least one metal from Group IA or Group IIA of the Periodic Table or oxide(s) thereof;
    (e) 0 to 15.0 wt. % of at least one selected from the group consisting of silicon, phosphorus, boron and fluorine, or oxide(s) thereof; and
    (f) 0 to 10.0 wt. % of at least one metal from Group IVB of the Periodic Table or oxide(s) thereof,
    with the percentages being based on the total weight of the catalyst.

2. The Ni-based catalyst according to claim 1, comprising the following components supported on an alumina support:
    (a) 10.0 to 30.0 wt. % of metallic nickel or oxide(s) thereof;
    (b) 0.1 to 15.0 wt. % of at least one of molybdenum and tungsten, or oxide(s) thereof;
    (c) 0.1 to 5.0 wt. % of at least one rare earth element or oxide(s) thereof;
    (d) 0.2 to 0.8 wt. % of at least one metal from Group IA or Group IIA of the Periodic Table or oxide(s) thereof;
    (e) 0.5 to 10.0 wt. % of at least one selected from the group consisting of silicon, phosphorus, boron and fluorine or oxide(s) thereof; and
    (f) 0.1 to 5.0 wt. % of at least one metal from Group IVB of the Periodic Table or oxide(s) thereof,
    with the percentages being based on the total weight of the catalyst.

3. The Ni-based catalyst according to claim 1, wherein the at least one rare earth element is lanthanum and/or cerium; the at least one metal from Group IA or IIA of the Periodic Table is at least one of potassium, calcium, magnesium, and barium; and the at least one metal from Group IVB of the Periodic Table is titanium and/or zirconium.

4. The Ni-based catalyst according to claim 1, wherein the alumina support has a specific surface area of from 100 to 180 $m^2/g$, and a total pore volume of from 0.5 to 1.2 ml/g.

5. The Ni-based catalyst according to claim 4, wherein the alumina support has a specific surface area of from 120 to 160 $m^2/g$, and a total pore volume of from 0.8 to 1.2 ml/g.

6. The Ni-based catalyst according to claim 4, wherein in the alumina support, a pore volume of pores having a pore diameter of less than 30 nm accounts for 20 to 80% of the total pore volume; a pore volume of pores having a pore diameter of from 30 to 60 nm accounts for 5 to 65% of the total pore volume; and a pore volume of pores having a pore diameter of larger than 60 nm accounts for 20 to 50% of the total pore volume.

7. The Ni-based catalyst according to claim 6, wherein in the alumina support, the pore volume of pores having a pore diameter of less than 30 nm accounts for 20 to 60% of the total pore volume; the pore volume of pores having a pore diameter of from 30 to 60 nm accounts for 20 to 40% of the total pore volume; and the pore volume of pores having a pore diameter of larger than 60 nm accounts for 25 to 45% of the total pore volume.

8. The Ni-based catalyst according to claim 1, wherein the catalyst comprises nickel grains having an average particle size of from 2 to 4.5 nm.

9. The Ni-based catalyst according to claim 8, wherein the catalyst comprises nickel grains having an average particle size of from 2 to 4 nm.

10. The Ni-based catalyst according to claim 1, further comprising 0.01 to 10.0 wt. % of sulfur or compound(s) thereof, based on the total weight of the catalyst.

11. The Ni-based catalyst according to claim 10, wherein the sulfur or compound(s) thereof is/are contained in an amount of from 0.1 to 8.0 wt. %, based on the total weight of the catalyst.

12. A process for preparing the catalyst according to claim 1, comprising the steps of
    i) providing an alumina support, which comprises optionally part or all of the catalyst component (d), and optionally part or all of the catalyst component (e) if desired;
    ii) dissolving materials providing the other catalyst components in desired amounts in water to form an impregnation solution;
    iii) impregnating the alumina support with the impregnation solution to provide an impregnated support;
    iv) drying the impregnated support;
    v) optionally, repeating steps iii) and iv) for one or more times; and
    vi) calcining the dried support from step iv) or v) in air, to give an oxidized catalyst.

13. The process according to claim 12, further comprising reducing the oxidized catalyst.

14. A process for preparing the catalyst according to claim 10, comprising the steps of
    i) providing an alumina support, which comprises optionally part or all of the catalyst component (d), and optionally part or all of the catalyst component (e) if desired;
    ii) dissolving materials providing the other of the catalyst components (a)-(f) in desired amounts in water to form an impregnation solution;
    iii) impregnating the alumina support with the impregnation solution to provide an impregnated support;
    iv) drying the impregnated support;
    v) optionally, repeating steps iii) and iv);
    vi) calcining the dried support from step iv) of v) in air, to give an oxidized catalyst;
    vii) reducing the oxidized catalyst to give a reduced catalyst; and
    viii) sulfurizing the reduced catalyst with a sulfurizing agent.

15. A process for selectively hydrogenating a pyrolysis gasoline, comprising contacting the pyrolysis gasoline with the Ni-based catalyst according to claim 1 under hydrogenation conditions.

* * * * *